United States Patent
Suzuki et al.

(10) Patent No.: US 7,953,106 B2
(45) Date of Patent: May 31, 2011

(54) TRANSMISSION APPARATUS

(75) Inventors: Rei Suzuki, Yokohama (JP); Eita Miyasaka, Yokohama (JP); Yoshimasa Kusano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 166 days.

(21) Appl. No.: 12/336,556

(22) Filed: Dec. 17, 2008

(65) Prior Publication Data

US 2009/0232004 A1 Sep. 17, 2009

(30) Foreign Application Priority Data

Mar. 11, 2008 (JP) ................. 2008-061494

(51) Int. Cl.
*H04L 12/66* (2006.01)
(52) U.S. Cl. ........................................ 370/463
(58) Field of Classification Search ........... 370/351, 370/352, 356, 464, 498, 535, 537, 389, 391, 370/522, 527, 466, 431, 463; 398/43, 45, 398/48, 49
See application file for complete search history.

(56) References Cited

U.S. PATENT DOCUMENTS

| | | | |
|---|---|---|---|
| 7,760,723 B1 * | 7/2010 | Daines et al. | 370/389 |
| 2004/0114638 A1 * | 6/2004 | Matsuura et al. | 370/537 |
| 2007/0116055 A1 | 5/2007 | Atsumi et al. | |

FOREIGN PATENT DOCUMENTS

JP 2007-110457 4/2007

* cited by examiner

*Primary Examiner* — Kwang B Yao
*Assistant Examiner* — Obaidul Huq
(74) *Attorney, Agent, or Firm* — Antonelli, Terry, Stout & Kraus, LLP.

(57) ABSTRACT

In a transmission apparatus of a Gigabit Ethernet signal, in order to improve line efficiency, time division multiplexing is used. Further, if it is possible to branch/insert plural multiplexed Gigabit Ethernet signals at arbitrary nodes, it is possible to construct a more flexible network. For this reason, importance of a time division multiplexing apparatus having a function of branching/inserting Gigabit Ethernet signals is growing. A Gigabit Ethernet signal is monitored at the previous and subsequent stages of a cross connect unit, IFGs are inserted to the signal and switching is waited. If a signal state at the cross connection unit is an IFG, transmission path switching is performed, thereby performing transmission path switching without instantaneous interruption.

3 Claims, 5 Drawing Sheets

US 7,953,106 B2

TRANSMISSION APPARATUS

CLAIM OF PRIORITY

The present application claims priority from Japanese patent application serial no. 2008-061494, filed on Mar. 11, 2008, the content of which is hereby incorporated by reference into this application.

BACKGROUND OF THE INVENTION

The present invention relates to a transmission apparatus for branching/inserting a Gigabit Ethernet signal, and in particular, to a transmission apparatus for switching transmission paths without instantaneous interruption.

In recent years, broadband lines have spread for Internet services into homes and a demand for lines for IP traffic has been increasing. Accordingly, inexpensive high-speed Gigabit Ethernet has been rapidly spread in a market, in substitution for SONET/SDH, ATM, and so on which were the mainstream of WAN up to now.

The Gigabit Ethernet is a standard compatible with the Fast Ethernet standard, which is widely used in LANs for offices, and layer 2 in the OSI reference model. The types of Gigabit Ethernet signals are roughly classified into two, and there are 1000BASE-X which uses light as a transmission medium and 1000BASE-T which uses Category 5 or higher unshielded twisted pair (UTP) cable as a transmission medium. In particular, the former, 1000BASE-X is widely spread in a market in an access aspect and in a trunk line aspect because it is advantageous in that it can transmit over a long distance and optical devices are low cost.

Here, a Gigabit Ethernet signal is explained in more detail. The Gigabit Ethernet signal is the same as an Ethernet signal of 10BASE-T (a data rate: 10 Mbits/s) or 100BASE-T (a data rate: 100 Mbits/s) in that user data is transmitted in MAC frames defined in sections 2 and 3 of IEEE 802.3z (IEEE 802.3z Type 1000BASE-X MAC Parameters, Physical Layer, Repeater, and Management Parameters for 1000 Mb/s Operation). However, in the Gigabit Ethernet signal in which a data rate is 1 Gbits/s, 8 B10 B code defined in the section 36.2 of IEEE 802.3z is used as code of a physical layer.

In the 8 B10 B code, 256 kinds of data with a code group name being represented by "Dxx.x" and 12 types of special symbols with the code group name represented by "Kxx.x" are defined. A code (order set) with a combination of these codes and special symbols is for use as a flag "/I/" which indicates a null signal state such as an inter-frame gap (IFG) between MAC frames, flags "/S/, /R/, /T/" indicative of the start position of a MAC frame or the end of a frame, or equivalents thereto. In FIG. 2 of JP-A-2007-110457, individual order sets and the meanings thereof are disclosed. These order sets include a code which is called the "Configuration" (/C1/ or /C2/). This configuration is for use in auto-negotiation (AN), which is for exchanging the operation mode or the state of a self device between linked devices. The auto-negotiation is a function that is defined in the section 37 of IEEE 802.3z.

In FIG. 1 of JP-A-2007-110457, a part of an 8 B10 B code table defined by IEEE 802.3z is disclosed. The 8 B10 B encoding refers to a scheme for encoding an 8-bit data into 10-bit data on the basis of a defined conversion table such as shown in FIG. 1 of JP-A-2007-110457. For a single 8-bit data, two types of data are defined, one of which is a 10-bit data stream having more (or equal) logic zeros ("0"s) than (or to) logic ones ("1"s), and the other of which is a 10-bit data stream having more (or equal) "1"s than (or to) "0"s, while eliminating the use of a pattern with the ratio of the numbers of "0"s and "1"s being extremely unbalanced with either of them. This 8 B10 B encoding is a technique for performing encoding while balancing so as to permit the number of 0s to become substantially equal to the number of 1s by the selective use of any one of these two kinds of data patterns, i.e., the data that includes more (or equal) 0s than (or to) 1s and the data including more (or equal) 1s than (or to) 0s, in accordance with an accumulated number difference (the running disparity RD) of 0s or 1s to be contained in a stream of code words which was output until immediately before the encoding. More specifically, the processing is achieved as follows: if 1s are greater in number than 0s in the running disparity (RD) at the time point of interest, then set the RD value to "+," followed by outward transmission of data on the Current RD+ side in the 8 B10 B code table of FIG. 2 of JP-A-2007-110457; if 0s are more than is in the running disparity, then set RD value to "−," followed by outward transfer of data on the Current RD− side in the 8 B10 B code table of FIG. 2 of JP-A-2007-110457.

For example, an 8-bit data stream "00001010" is converted into 10-bit data of "010101 1011" when 0s are greater in number in the running disparity at that time (i.e., RD is at "−") and is converted to 10-bit data of "010101 0100" 1s are greater in number in the running disparity (i.e., RD is at "+"). On a signal receipt side, it is possible to detect the presence or absence of data errors by checking whether this RD value's rule is under compliance.

Here, the RD side of the IFG is described. The code groups constituting the IFG are divided into "/I1/" and "/I2/". "/I1/" is inserted when the RD immediately before becoming the IFG was at "+", and after encoding of "/I1", the RD is inverted to be necessarily at "−". "/I2/" is inserted after encoding of "/1/" when the RD immediately before becoming the IFG was at "−" and after encoding of "/I2/", the RD necessarily is at "−". Therefore, even if "/I1/" is inserted on the basis of the immediately preceding RD value, as a result, the IFG becomes the "/I2/" and thus the RD is at "−".

In FIG. 3 of JP-A-2007-110457, there are disclosed a format of MAC frame defined in IEEE 802.3z and a format of a Gigabit Ethernet signal that is generated by applying 8 B10 B encoding to a MAC frame. MAC refers to the protocol which belongs to layer 2 of the OSI reference model. Exchanging the protocol is defined in IEEE 802.3z. A frame during the exchange of the protocol is called the MAC frame. The role of the MAC frame is to store the protocol and/or data of layer 3 or higher of the OSI reference model in a data field of the MAC frame and also to reliably transfer this stored protocol of layer 3 or higher to a target terminal.

In FIG. 3 of JP-A-2007-110457, the MAC frame essentially includes a preamble (8 bytes) indicative of the beginning of MAC frame, a destination address (6 bytes) indicating a MAC address of a destination terminal of the MAC frame, a source address (6 bytes) indicating a MAC address of a terminal to which the MAC frame is forwarded, a length/type field (2 bytes) indicating the length or type of MAC frame, a data field (variable length) and a check sum value (4 bytes), wherein a data (12 bytes or more) indicative of the null signal state, called the inter-frame gap (IFG) is flown between the MAC frame and a MAC frame adjacent thereto. This data stream of an Ethernet signal with 8 bits being as a unit is converted (8 B/10 B-encoded) into a 10-bit data stream in units of respective bytes, resulting in acquisition of the Gigabit Ethernet signal.

More specifically, a block of 8 bits of each byte is replaced by a 10-bit data stream (codeword, also known as code-group) or by an order set that is an ensemble thereof, while changing IFG to /I/ (idle), the byte at the beginning of MAC frame to /S/, a respective one of the preamble, destination and source addresses, length/type, data, and a check sum value (i.e., frame check sequence or "FCS") to one of 256 kinds of /D/s (data), and a byte immediately after the MAC frame to either /T/R/ or /T/R/R/. In the Gigabit Ethernet signal, an 8-bit length data segment is converted into 10-bit length data on a per-byte basis, so the rate of a physical layer is 10/8 times greater than 1 Gbits/s, that is, 1.25 Gbps.

In this manner, the Gigabit Ethernet signal is the one that is an 8 B/10 B-encoded version of MAC frame as defined in IEEE 802.3z.

Gigabit Ethernet Add/Drop Multiplexers (ADM) in use for transmission apparatuses using Gigabit Ethernet signals have received attention in views of line efficiency and flexibility of network construction in recent years. The Gigabit Ethernet ADMs perform electrical time division multiplexing on plural Gigabit Ethernet signals so as to improve the efficiency of line use and branch/insert those time division multiplexed Gigabit Ethernet signals at arbitrary nodes. A Gigabit Ethernet ADM branches/inserts each Gigabit Ethernet signal to be contained by switching transmission circuits in a cross connect unit of the device for every Gigabit Ethernet signals.

A configuration of a network using a Gigabit Ethernet ADM will be described with reference to FIG. 1. FIG. 1 is a block diagram of hardware of a network. In FIG. 1, a network 1000 includes a bureau building 100-1, a bureau building 100-3, a bureau building 100-2, and a bureau building 100-4 which are disposed clockwise in a ring shape. The bureau building 100-1 includes a transmission apparatus 200-1 and plural user apparatuses 300 including a user apparatus 300-A. The bureau building 100-3 includes a transmission apparatus 200-3 and plural user apparatuses 300. The bureau building 100-2 includes a Gigabit Ethernet ADM 500 and plural user apparatuses 300 including a user apparatus 300-B and a user apparatus 300-C. The bureau building 100-4 includes a transmission apparatus 200-4 and plural user apparatuses 300 including a user apparatus 300-D.

The Gigabit Ethernet ADM 500 freely changes a transmission path according to a user's convenience to assign a Gigabit Ethernet signal transmitted from the user apparatus 300-A disposed in the bureau building 100-1 to the user apparatus 300-B of the bureau building 100-2 (a solid line+a dashed line) or the user apparatus 300-D of the bureau building 100-4 (a solid line) or to transmit a Gigabit Ethernet signal from the user apparatus 300-C of the bureau building 100-2 together with the Gigabit Ethernet signal from the user apparatus 300-A to the user apparatus 300-D (an alternate long and short dash line+solid line).

As described above, using the Gigabit Ethernet ADM 500 makes it possible to construct a flexible network.

On the other hand, transmission apparatuses are generally required to transparently transmit a transmission signal in view of maintenance and operation. The term "transparent transmission" means that, for example, in the configuration of the network shown in FIG. 1, a state in which the transmission apparatus 200-1, the transmission apparatus 200-3, and the Gigabit Ethernet ADM 500 are physically disposed between the user apparatus 300-A disposed in the bureau building 100-1 and the user apparatus 300-B disposed in the bureau building 100-2 is equal to a state in which the user apparatus 300-A is logically connected to the user apparatus 300-B directly. Specifically, the term "transparent transmission" means that a signal output from the user apparatus 300-A is transmitted to the user apparatus 300-B without changing contents of data or the format of the signal. Even in a transmission apparatus such as a Gigabit Ethernet ADM, it is important to switch transmission paths without generating any transmission errors due to switching, that is, instantaneous interruption.

When a cross connect unit of a Gigabit Ethernet ADM switches communication signals, if switching is performed without monitoring a state of a signal to be transmitted, interruption of a packet during transmission, leakage of data including errors due to non-conservation of running disparity, and transmission to a wrong transmission destination due to combination with other packets may occur. In transmission apparatuses, in particular, apparatuses required to perform transparent transmission, it is required to prevent a wrong transmission of data as described above when transmission paths are switched.

In order to cope with instantaneous interruption occurring when transmission paths are switched, in SONET/SDH, various methods such as a method of calculating an amount of delay due to a path difference between a working system and a protection system and inserting a delay time to the protection system by a memory when switching is performed have been found. However, instantaneous interruption of a Gigabit Ethernet signal according to switching of transmission paths has not been solved until now.

The frame length of a SONET/SDH signal is fixed, while the packet length and IFG length of a Gigabit Ethernet signal are variable. Therefore, it is necessary to monitor a state of transmission data and to perform switching at a timing when the transmission data is not affected.

SUMMARY OF THE INVENTION

In order to solve the above-mentioned problems, it is an object of the present invention to monitor a Gigabit Ethernet signal at the previous and subsequent stages of a cross connect unit and to switch transmission paths in the cross connect unit according to a result of detection on whether an IFG of the Gigabit Ethernet signal is "/I2/" (whether the Gigabit Ethernet signal is at an idle state). A running disparity is conserved by switching at an IFG. In other words, even when a Gigabit Ethernet signal is inserted, transmission path switching is performed by switching without detecting a data error due to the running disparity.

In order to solve the problems, according to an aspect of the present invention, a transmission apparatus having a path switching unit and performing switching of a transmission path of a Gigabit Ethernet signal is provided. In this transmission apparatus, the path switching unit includes a first packet identifying unit, a cross connect unit, and a second packet identifying unit. When the first packet identifying unit receives a gap signal, the gap signal is extended, and when the second packet identifying unit receives a gap signal, the cross connect unit switches a path and shortens the gap signal.

According to another aspect of the present invention, a transmission apparatus having a path switching unit and performing switching of a transmission path of a Gigabit Ethernet signal is provided. In this transmission apparatus, the path switching unit includes a first input system, a second input system, a cross connect unit, a second packet identifying unit, and a control unit. The first input system includes a first identifying unit, a pattern generator, and a first selector for selecting one of output signals of the first identifying unit and the pattern generator. The second input system includes a destuffing unit for destuffing an input signal, a memory for buffering an output signal of the destuffing unit, and a second selector for selecting one of the input signal and an output signal of the memory. The control unit, when receiving a switch set signal, monitors reception of a gap signal at the first identifying unit, and when the gap signal is received, an output signal of the first selector is switched from an output signal of the first identifying unit to an output signal of the pattern generator. Further, the control unit monitors reception of a gap signal at the second identifying unit, and when the gap signal is received, a path to the second identifying unit in the cross connect unit is switched from the first input system to the second input system and an output signal of the second selector is switched from the input signal to an output signal of the memory. When a phase of the input signal of the second selector is the same as a phase of the output signal of the memory, the output signal of the second selector is switched from the output signal of the memory to the input signal.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Figure 1:
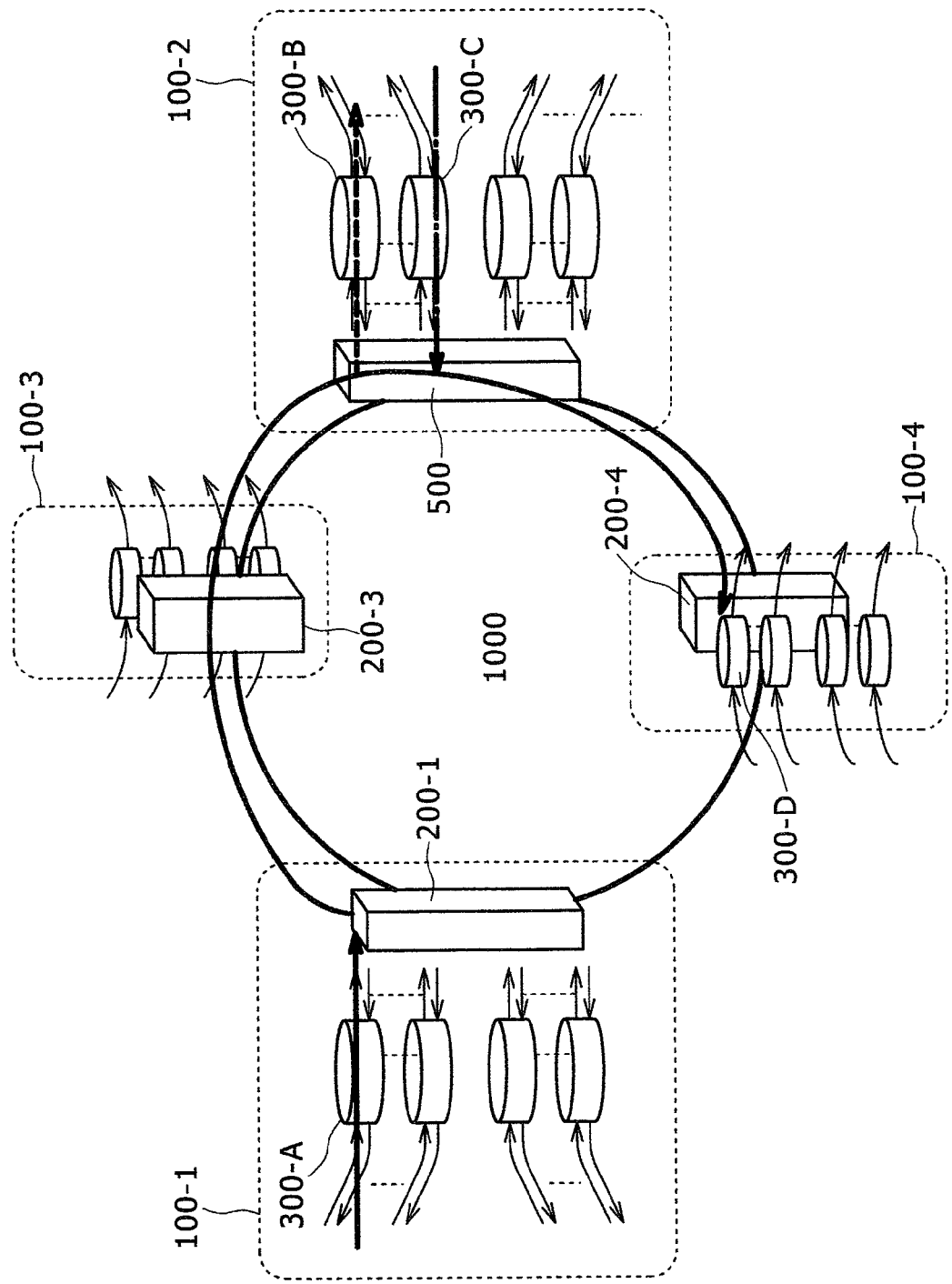
FIG. 1 is a block diagram of hardware of a network.

Hereinafter, modes of the invention will be described with reference to the accompanying drawings illustrating embodiments. Moreover, the substantially same parts are denoted by identical reference numerals, and repeated description will be omitted.

Figure 2:
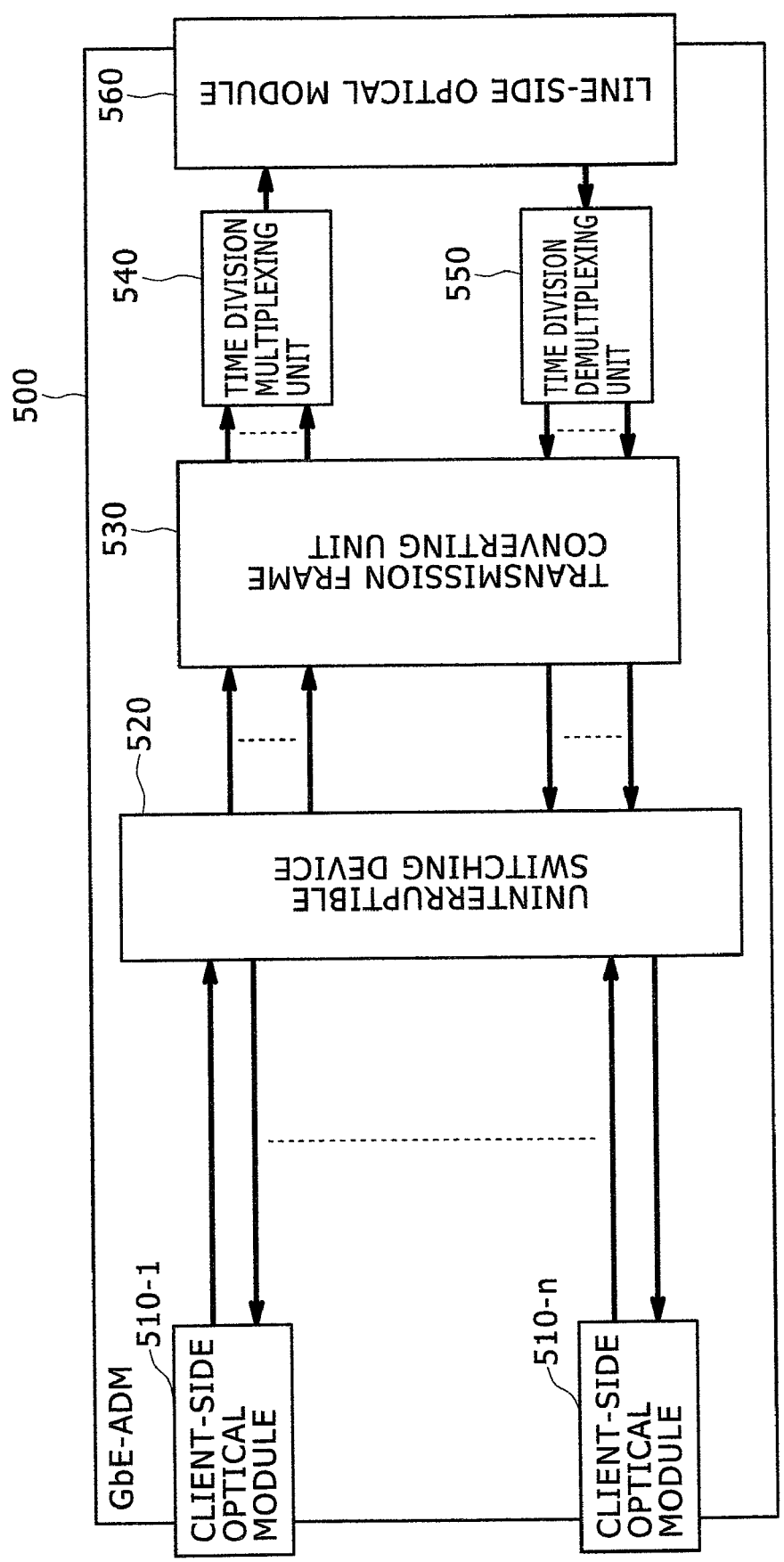
FIG. 2 is a block diagram of hardware of a Gigabit Ethernet ADM.

A configuration of a Gigabit Ethernet ADM will be described with reference to FIG. 2. FIG. 2 is a block diagram of hardware of a Gigabit Ethernet ADM. In FIG. 2, a Gigabit Ethernet ADM 500 includes an n-number of client-side optical modules 510, an uninterruptible switching device 520, a transmission frame converting unit 530, a time division multiplexing unit 540, a time division demultiplexing unit 550, and a line-side optical module 560.

Each of the client-side optical modules 510 converts an electrical signal from the uninterruptible switching device 520 into an optical signal and transmits the optical signal to a user apparatus 300. Moreover, each of the client-side optical modules 510 converts an optical signal from the user apparatus 300 into an electrical signal and transmits the electrical signal to the uninterruptible switching device 520.

The uninterruptible switching device 520 switches paths without instantaneous interruption. The transmission frame converting unit 530 encapsulates a Gigabit Ethernet signal into an optical transport network (OTN) signal which is a signal for long-distance transmission. Moreover, the transmission frame converting unit 530 decapsulates a Gigabit Ethernet signal from an OTN signal.

The time division multiplexing unit 540 performs time division multiplexing on parallel signals from the transmission frame converting unit 530 and transmits a serial signal to the line-side optical module 560. The time division demultiplexing unit 550 performs time division demultiplexing on a serial signal from the line-side optical module 560 and transmits parallel signals to the transmission frame converting unit.

The line-side optical module 560 converts a serial electrical signal from the time division multiplexing unit 540 into an optical signal and transmits the optical signal to another transmission apparatus. Moreover, the line-side optical module 560 converts an optical signal from another transmission apparatus into an electrical signal and transmits the electrical signal to the time division demultiplexing unit 550.

Figure 3:
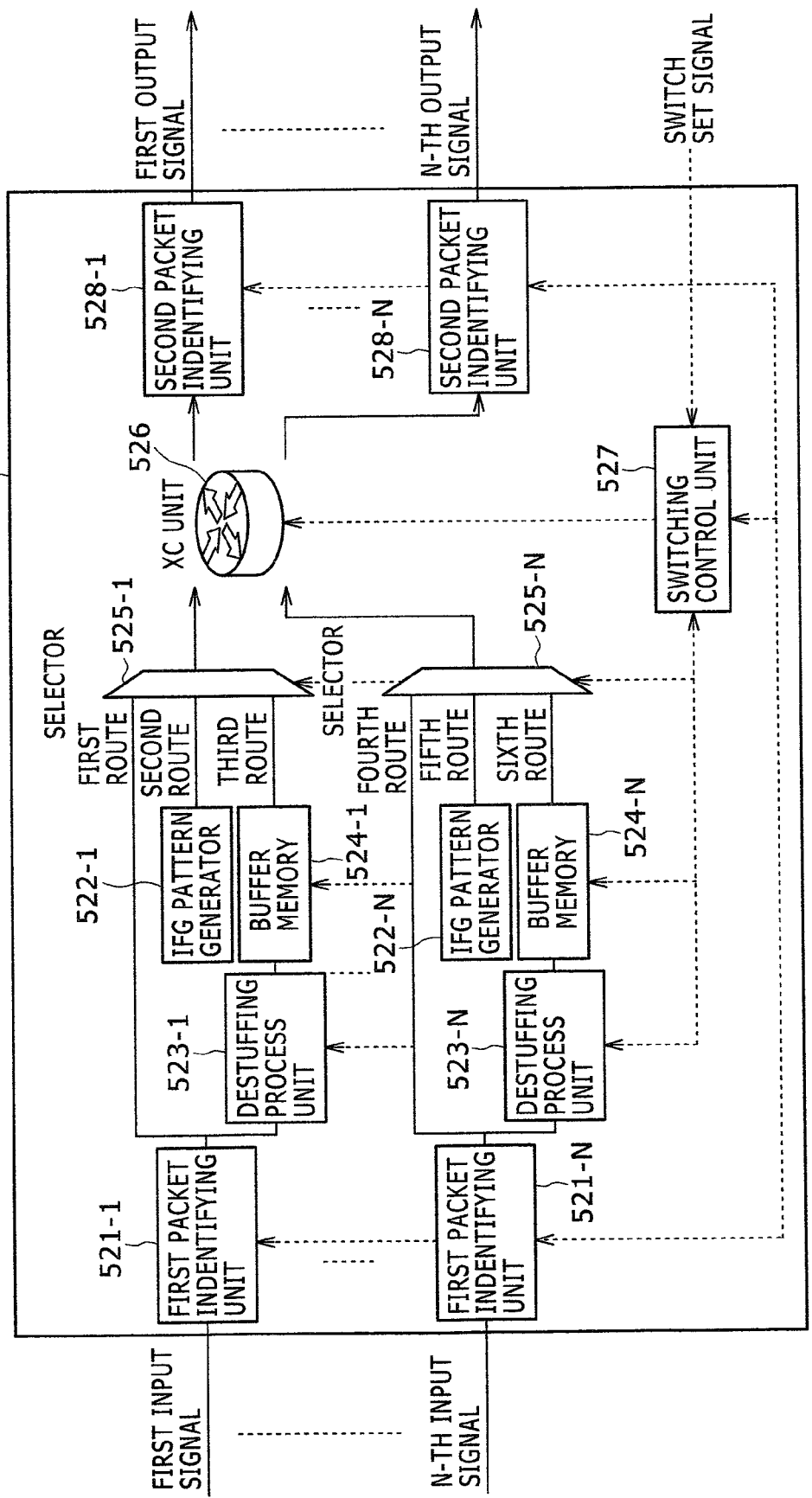
FIG. 3 is a block diagram of hardware of an uninterruptible switching device.

A configuration and switching operation of an uninterruptible switching device will be described with reference to FIG. 3. FIG. 3 is a block diagram of hardware of an uninterruptible switching device. Here, it is assumed that transmission path switching is performed from a working system in which a first input signal is output as a first output signal to a protection system in which an N-th input signal is output as a first output signal and the first input signal and the N-th input signal have the same data.

In FIG. 3, an uninterruptible switching device 520A shows only one-directional operation of the uninterruptible switching device 520 of FIG. 2. The uninterruptible switching device 520A includes a n-number of first packet identifying units 521, a n-number of destuffing process units 523, a n-number of buffer memories 524, a n-number of IFG pattern generators 522, a n-number of selectors 525, a cross connect unit (XC unit) 526, a n-number of second packet identifying units 528, and a switching control unit 527.

Each of the selectors 525 selects one of an output of a corresponding first packet identifying unit 521, an output of a corresponding IFG pattern generator 522, and an output of a corresponding buffer memory 524, and is connected to the XC unit 526. The XC unit 526 connects output terminals of the n-number of selectors 525 to any one of the n-number of second packet identifying units 528.

Before switching, a selector 525-1 selects a first route and a first input signal is input to a first packet identifying unit 521-1, is transmitted to a second packet identifying unit 528-1 through the XC unit 526, and is output as a first output signal. Meanwhile, a signal passing through a third route is subjected to a destuffing process, in which extraction is performed such that an IFG length is changed from 12 bytes to 10 bytes, by a corresponding destuffing process unit 523, and is stored in a corresponding buffer memory 524. However, since the signal passing through the third route is not selected by a corresponding selector 525, it is not read out from the corresponding buffer memory 524.

Here, it is assumed that each of the first packet identifying units 521 and the selectors 525 has a sufficiently small amount of delay time and a signal state in a first packet identifying unit 521 is the same as a signal state in a corresponding selector 525.

It is assumed that some troubles occur in the first input signal. In this case, a monitoring system operating the network outputs a switching command and a switch set signal is input to the uninterruptible Gigabit Ethernet ADM 500.

At first, under control of the switching control unit 527, the first packet identifying unit 521-1 determines whether a passing signal is a packet or an IFG. An IFG is generally 12 bytes. In an IFG, when a head byte is "/I1/", the subsequent 11 bytes are "/I2/". Further, even when the head byte is "/I2/", the subsequent 11 bytes are "/I2/". Therefore, if finding "/I2/", the first packet identifying unit 521-1 may determine that the signal is an IFG. Since it passes at least a head byte during transmission path switching, a running disparity is conserved.

When a signal state is a packet state, the first packet identifying unit 521-1 stands by until the signal state becomes an IFG state. IFG detection of the first packet identifying unit 521-1 serves as a trigger which makes a corresponding selector 525 perform switching to a second route. Next, under control of the switching control unit 527, the second packet identifying unit 528-1 determines whether a signal state is a packet state or an IFG state. If the signal state is a packet state, the second packet identifying unit stands by until the signal state becomes an IFG state. When the second packet identifying unit 528-1 determines that the signal state is an IFG state, the XC unit 526 performs transmission path switching from a path along which the first input signal is output as the first output signal to a path along which the N-th input signal is output as the first output signal.

At the same time as the switching, a selector 525-N selects a sixth route. When the sixth route is selected, data stored in a buffer memory 524-N is output through the XC unit 526 as the first output signal. In this case, since the data stored in the buffer memory 524-N has been subjected to a destuffing process, an IFG portion becomes shorter than the original signal thereof before the switching. Therefore, the delay time of each of the packet passing through the sixth route and a packet passing through a fourth route is reduced and thus it is possible to make the phase of the tail of the packet having passed through the fourth route same as the phase of the packet having passed through the sixth route, in an input part of the selector 525-N. When the phases of the last bits of the packets, which have passed through the fourth route and the sixth route, respectively, are the same as each other, the switching control unit 527 controls the selector 525-N to select the fourth route, thereby completing switching from the sixth route to the fourth route.

Figures 4A, 4B:
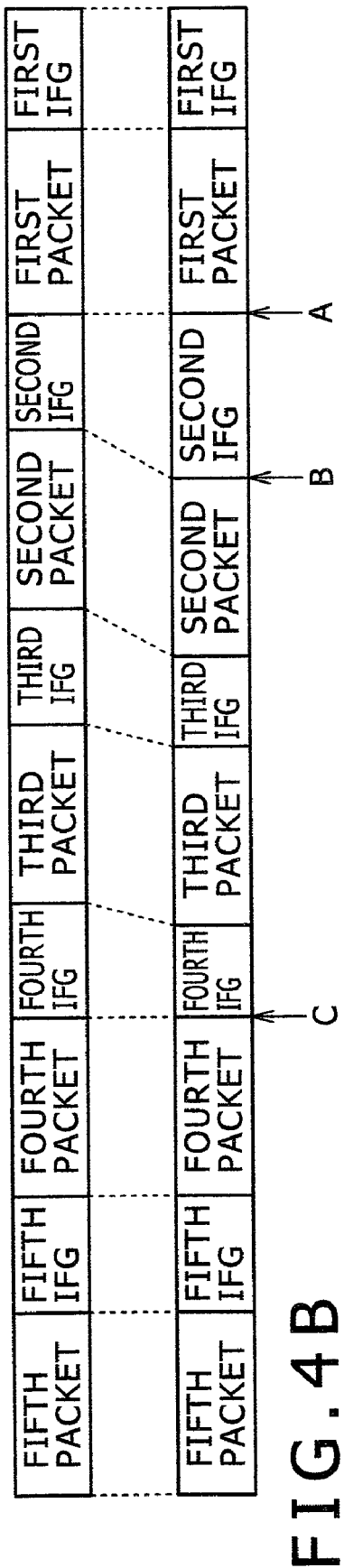
FIGS. 4A and 4B are diagrams schematically illustrating gigabit signals received by a receiving apparatus when no switching is performed and when switching is performed.

This signal switching process will be described with reference to FIGS. 4A and 4B. FIGS. 4A and 4B are diagrams illustrating a signal switching process. FIG. 4A shows a data stream when no switching is performed, and FIG. 4B shows a data stream when switching is performed. The heads of the data streams are on the right side of FIGS. 4A and 4B. In FIG. 4B, switching from the first route to a second route is performed at a head of a second IFG indicated by an arrow A and thus the length of the second IFG is extended. Further, switching from the second route to the sixth route is performed at a position indicated by an arrow B and thus the lengths of a third IFG and a fourth IFG are reduced. Furthermore, switching from the sixth route to the fourth route is performed at a position indicated by an arrow C. As a result, a timing of the data stream (FIG. 4B) when switching is performed coincides with a timing of the data stream (FIG. 4A) when no switching is performed.

Figure 5:
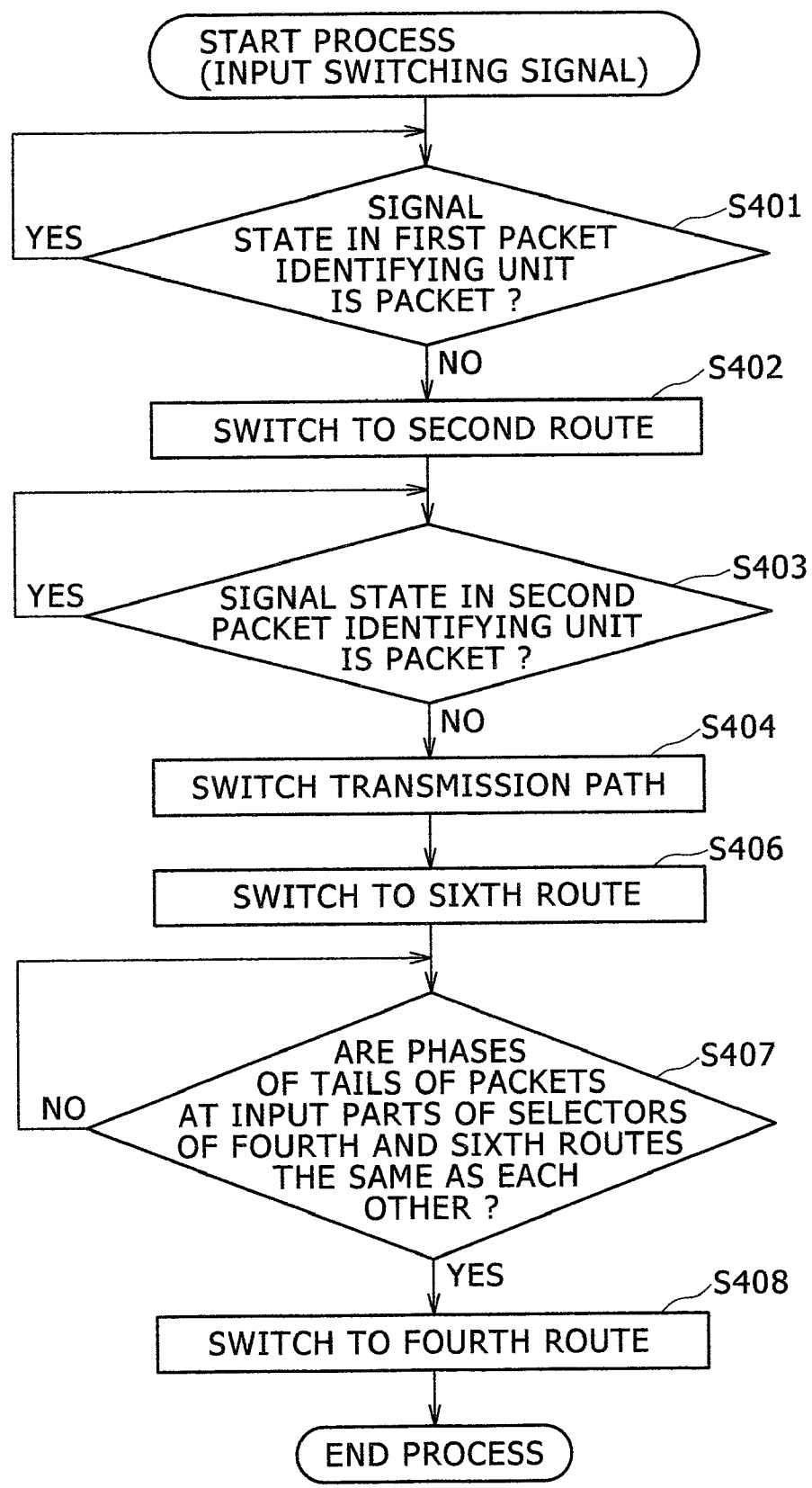
FIG. 5 is a flow chart of an uninterruptible switching process.

A flow of signal switching will be described with reference to FIG. 5. FIG. 5 is a flow chart of signal switching. In FIG. 5, the Gigabit Ethernet ADM 500 determines whether a signal at a first packet identifying unit of the working system is a packet or not (S401). If the signal is a packet (Yes in S401), the Gigabit Ethernet ADM 500 returns to Step 401, and if the signal is not a packet (No in S401), the second route is selected (S402). The Gigabit Ethernet ADM 500 determines whether a signal at a second packet identifying unit of the working system is a packet or not (S403). If the signal is a packet (Yes in S403), the Gigabit Ethernet ADM 500 returns to Step 403, and if the signal is not a packet (No in S404), transmission path switching is performed such that the sixth route is selected (S406). The Gigabit Ethernet ADM 500 determines whether the phases of the tails of packets of the fourth and sixth routes are the same as each other at input parts of selectors of the protection system or not (S407). If the phases are not the same as each other (No in S407), the Gigabit Ethernet ADM 500 returns to Step 407. If the phases are the same as each other (Yes in S407), the Gigabit Ethernet ADM 500 selects the fourth route by a selector 525 of the protection system (S408) and ends the process.

According to this exemplary embodiment, transmission path switching without instantaneous interruption can be performed without decoding an 8 B/10 B signal into a MAC frame without termination.

An uninterruptible Gigabit Ethernet ADM according to embodiments switches transmission paths without instantaneous interruption. Therefore, it is possible to freely construct a network.

What is claimed is:

1. A transmission apparatus having a path switching unit and performing switching of a transmission path of a Gigabit Ethernet signal,
   wherein the path switching unit includes a first input system, a second input system, a cross connect unit, a second packet identifying unit, and a control unit,
   the first input system includes a first identifying unit, a pattern generator, and a first selector for selecting one of output signals of the first identifying unit and the pattern generator,
   the second input system includes a destuffing unit for destuffing an input signal, a memory for buffering an output signal of the destuffing unit, and a second selector for selecting one of the input signal and an output signal of the memory,
   the control unit, when receiving a switch set signal, monitors reception of a gap signal at the first identifying unit, and when the gap signal is received, an output signal of the first selector is switched from an output signal of the first identifying unit to an output signal of the pattern generator, and
   the control unit monitors reception of a gap signal at the second identifying unit, and when the gap signal is received, a path to the second identifying unit in the cross connect unit is switched from the first input system to the second input system and an output signal of the second selector is switched from the input signal to an output signal of the memory, and
   when a phase of the input signal of the second selector is the same as a phase of the output signal of the memory, the output signal of the second selector is switched from the output signal of the memory to the input signal.

2. The transmission apparatus according to claim 1, wherein the gap signal is determined according to a signal pattern included in the gap signal.

3. The transmission apparatus according to claim 2, wherein the signal pattern is /I2/.

* * * * *